United States Patent [19]

Haas

[11] 4,088,982

[45] May 9, 1978

[54] DOCUMENT PROCESSING, CHARACTER READING APPARATUS

[75] Inventor: Frank J. Haas, Harper Woods, Mich.

[73] Assignee: Burroughs Corporation, Detroit, Mich.

[21] Appl. No.: 773,007

[22] Filed: Feb. 28, 1977

[51] Int. Cl.² ............................................. G06K 9/00
[52] U.S. Cl. .................... 340/146.3 ED; 340/146.3 H; 340/146.3 AH
[58] Field of Search .............. 340/146.3 C, 146.3 AH, 340/146.3 ED, 146.3 H, 146.3 MA; 209/DIG. 2, 111.7, 111.8; 235/61.11 E

[56] References Cited

U.S. PATENT DOCUMENTS

| | | | |
|---|---|---|---|
| 3,170,139 | 2/1965 | Rabinow | 340/146.3 R |
| 3,271,738 | 9/1966 | Kamentsky | 340/146.3 ED |
| 3,408,458 | 10/1968 | Hennis | 340/146.3 AH |
| 3,458,688 | 7/1969 | Garry et al. | 340/146.3 H |
| 3,506,963 | 4/1970 | Dohler et al. | 340/146.3 AH |
| 3,761,876 | 9/1973 | Flaherty et al. | 340/146.3 MA |

*Primary Examiner*—Leo H. Boudreau

*Attorney, Agent, or Firm*—Robert L. Kaner; Carl Fissell, Jr.; Kevin R. Peterson

[57] ABSTRACT

A high-speed apparatus that processes a stack of documents such as bank checks. The apparatus includes a feeder for serially feeding the documents, an error-indicating character reader for reading characters on the documents, an operator's console for manually inputting characters rejected by the character reader, and a sorter for sorting the documents into groups. The error-indicating character reader includes a character reader, a printer located a fixed distance from the character reader and an AC synchronous motor that drives each document serially past the reader and printer in a continuous motion. The character reader provides a first electrical signal when it cannot read a character. A motor velocity detecting means provides a second electrical signal representative of the motor velocity. A variable delay means that includes a phase locked loop and shift register circuitry delays the first electrical signal (can't read from the character reader) a variable time which time depends upon the second electrical signal (motor velocity). The output of the variable delay means commands the printer to print a mark beside the unreadable (rejected) character.

17 Claims, 9 Drawing Figures

0
DOCUMENT PROCESSING, CHARACTER READING APPARATUS

CROSS REFERENCE TO RELATED APPLICATION

U.S. Ser. No. 573,787 of Templeton; filed May 1, 1975; entitled "Method And Apparatus For Identifying Characters Printed on a Document Which Can Not Be Machine Read"; and assigned to common assignee.

BACKGROUND OF THE INVENTION

1. Field of the Invention

The invention relates in general to document processing apparatus having character readers; and more particularly to such apparatus that indicate on the document the characters that cannot be read.

2. Description of the Prior Art

Document processing apparatus having character readers are generally known. An important feature of such an apparatus is the capability to indicate on the document the fact that a character cannot be read so that, for example, the rejected or unreadable character can be input by the operator.

U.S. Pat. Nos. 3,408,458 of Hennis and 3,506,963 of Dohler et al describe apparatus that utilize flying spot optical scanners to read characters from a page while the document is stationary in a reading station. The described devices can mark the line containing an unreadable character after the paper has been moved. However, as a practical matter, such apparatus may not be able to process documents at as high a rate as may be desirable for many applications.

U.S. patent application Ser. No. 573,787 of Templeton, assigned to common assignee, describes an apparatus that reads a line of magnetic characters from a document as the document is driven in continuous motion via an AC synchronous motor past a character reader and a printer. The apparatus delays a can't read signal from the character reader a fixed predetermined time by clocking a shift register with a precision crystal oscillator and then actuates the printer. Such application also states that the frequency of the precision clock source could be adjusted so as to compensate for changing system conditions so as to insure that the mark is printed so as to properly identify only the characters which could not be machine read.

SUMMARY OF THE INVENTION

The present invention provides a document processing character reading apparatus that accurately indicates on the document the characters that cannot be read adjacent such characters regardless of variations in the velocity of the drive motor as the document passes in continuous motion relative to and past the character reader. The present invention detects the velocity of the motor, provides a variable delay of a can't read signal (from the character reader) based on the motor velocity and then feeds the appropriately delayed signal to an indicating means which identifies the character that could not be read on the document as the document passes in continuous motion relative to and past the indicating means.

The present invention includes a character reader, an indicating means, a motion means, a motor velocity detecting means and a variable delay means. The character reader reads characters from the document and provides a first electrical signal when it is not able to properly read a character. The indicating means is located a fixed distance from the character reader and identifies the characters that cannot be read on the document adjacent such characters. The motion means includes an AC synchronous motor that moves the document in a continuous motion relative to and past the character reader and indicating means. The motor velocity detecting means detects the velocity of the AC motor and provides a second electrical signal that is representative of such velocity. The variable delay means delays the first electrical signal (from the character reader) by a variable amount, which amount depends upon the second electrical signal (from the velocity means), to provide as an output a third electrical signal. The third electrical signal is fed to the indicating means to identifty on the document the character that could not be read adjacent such character.

Describing briefly the preferred embodiment, the character reader is a magnetic character reader that is fixed to the frame of the machine. The indicating means includes an impact-type dot printer located a fixed distance from the reader and fixed to the frame of the machine. Such indicating means also includes printer pulse-width and printer drive circuitry. (See FIG. 2) The motion means includes an AC synchronous motor that drives the document in a transport path, with such document passing adjacent the reader and printer. The motor velocity detecting means is a frequency detecting means that detects the frequency of excitation applied to the AC synchronous motor of the motion means. (See FIG. 2) The variable delay means includes a phase-locked loop and shift register circuitry. More particularly, the phase-locked loop (see FIG. 2) includes a phase-sensitive detector, a low pass filter, a voltage controlled oscillator and a counter circuit. In addition, the shift register circuitry includes a shift register, a two phase clock generator, a pair of level shifters and an associated data synchronizer.

DESCRIPTION OF THE PREFERRED EMBODIMENT

The preferred embodiment is a high speed document processing, character reading apparatus that processes documents such as bank checks. The apparatus reads a line of magnetic characters that are along the bottom portion of the checks; such magnetic characters identify federal reserve district number, bank number, account number, etc.

The apparatus includes a magnetic character reader and an impact printer. The printer is located approximately 3 inches (7.6 cm) away from the character reader and indicates the character or characters that cannot be read properly on the appropriate checks. The checks ride in a transport path past the character reader and the printer in continuous motion at a velocity of approximately 75 inches (190 cm) per second with an AC synchronous motor moving the checks via at least one pair of drive rollers such as a slip drive wheel-idle roller combination. When the character reader detects an unreadable character, the printer in turn prints a dot above such character on the check as it passes by the printer. The apparatus accurately indicates on the checks the characters that cannot be read adjacent such characters regardless of variations in the AC motor velocity as the checks pass in continuous motion past the character reader and printer. The apparatus detects the velocity of the motor, provides a variable delay of a can't read signal (from the character reader) based on the motor's velocity and then feeds the appropriately delayed signal to the printer.

Figure 1:
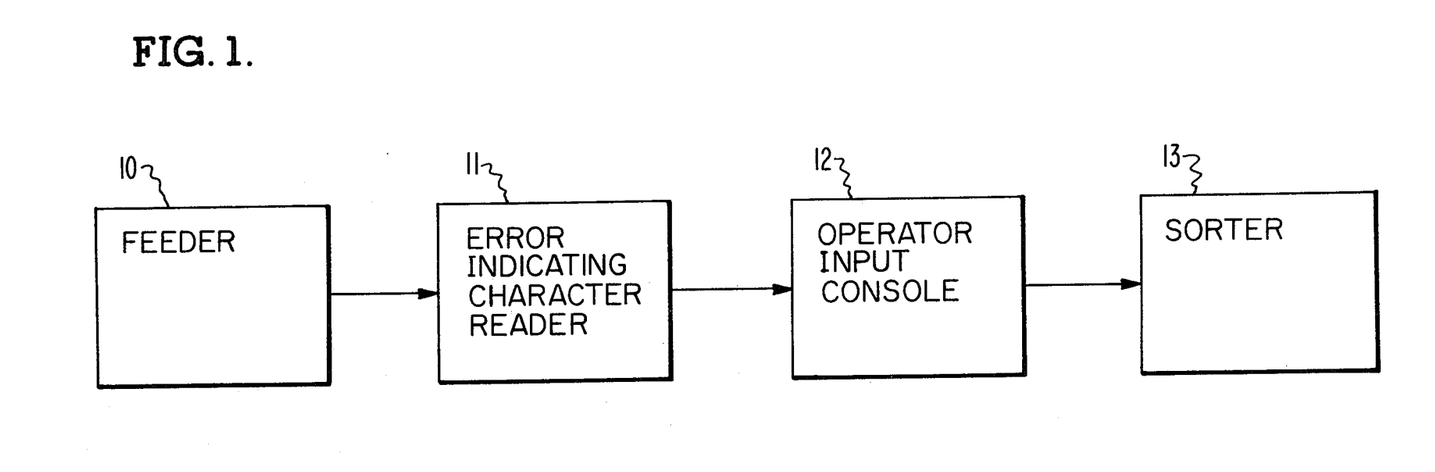
FIG. 1 is a block diagram of a document processing character reading apparatus utilizing the present invention.

FIG. 1 shows in block diagram form a high-speed check processing apparatus utilizing the present invention. A feeder 10 holds a stack of checks and feeds them serially to an error-indicating character reader 11 according to the present invention at a rate of approximately 8 per second. Reader 11 reads the line of magnetic characters on each check and marks the unreadable characters on each check as it passes therethrough at the velocity of approximately 75 inches (190 cm) per second. From the reader 11 the checks pass serially to an optional operator input console 12. Such console may stop the processing of checks when an unreadable character is detected and marked. Thus, the operator can look at the check having the error, manually input via a keyboard on the console 12 the rejected or unreadable character, amd then reinitiate automatic high-speed check processing. From the console 12 the checks pass serially to a sorter 13. The sorter 13 sorts the checks into groups in response to the magnetic characters read from the checks, information input via the operator, and information from other sources.

Figure 2:
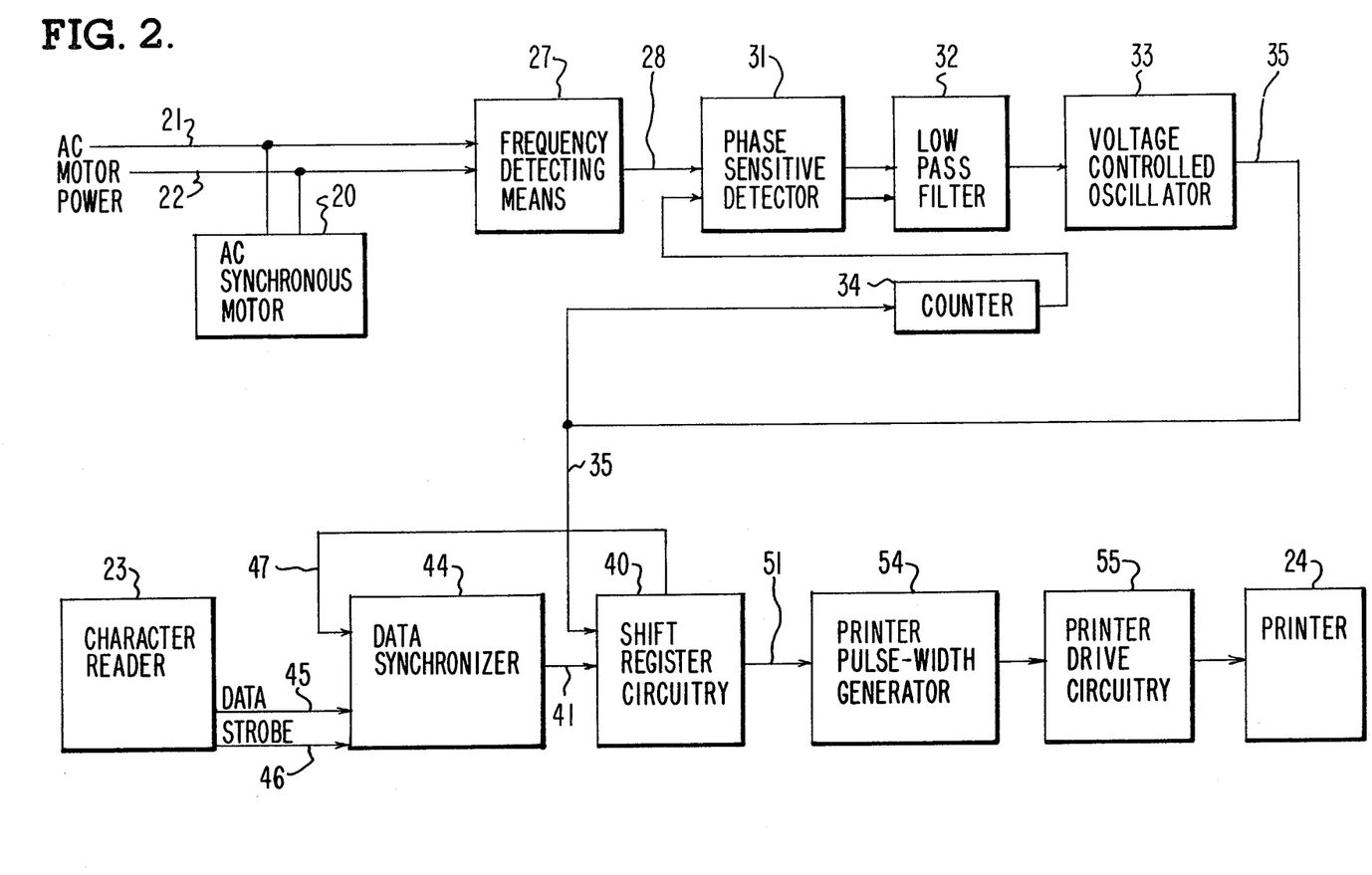
FIG. 2 is a block diagram of the electrical circuitry of the error-indicating character reader block of FIG. 1 and according to the present invention.

FIG. 2 shows a block diagram of the electrical circuitry of the error-indicating character reader 11 according to the present invention. An AC synchronous motor 20 receives power via leads 21 and 22. The motor 20 moves the check via drive rollers past a magnetic character reader 23 and an impact printer 24 in a continuous motion. As previously described, the reader 23 and the printer 24 are approximately 3 inches (7.6 cm) apart and the checks move at approximately 75 inches (190 cm) per second. The motor 20 and the drive rollers provide the motion means of the present invention.

The motor velocity detecting means of the present invention is provided by a frequency detecting means 27. Frequency detecting means 27 is operatively connected to AC synchronous motor power leads 21 and 22 and outputs a signal on conductor 28. Such signal is referred to in this patent application as the second signal and has a frequency representative of the AC motor velocity.

The variable delay means of the present invention is provided by a phase locked loop and shift register circuitry. The phase locked loop receives the signal on conductor 28 and includes a phase-sensitive detector 31, a low pass filter 32, a voltage controlled oscillator 33 and a counter 34. The phase locked loop outputs a high frequency signal on conductor 35. Such high frequency signal is also representative of the motor velocity.

Shift register circuitry 40 of the variable delay means uses the high frequency signal on conductor 35 as a clock and receives data input via conductor 41. Associated with shift register circuitry 40 is a data synchronizer 44 that synchronizes the first electrical signal (can't read data) from character reader 23 to the internal clock of shift register circuitry 40. Data synchronizer 44 receives data 45 and data strobe 46 from character reader 23 and an internal clock signal from shift register circuitry 40 via conductor 47 and provides a synchronized data input to shift register circuitry 40 via conductor 41. The combination of data 45 and strobe 46 is referred to in this patent application as the first electrical signal from the character reader 23. Shift register circuitry 40 outputs a signal on conductor 51, which signal is referred to in this patent application as the third electrical signal. The third electrical signal (on conductor 51) represents the first electrical signal (from character reader 23) delayed by a variable time which time depends upon the second electrical signal (from frequency detecting means 27).

The indicating means of the present invention receives the variably delayed electrical signal (the third electrical signal) on conductor 51 and includes a printer pulse width generator 54, a printer drive circuitry 55 and the impact printer 24.

Figure 3:
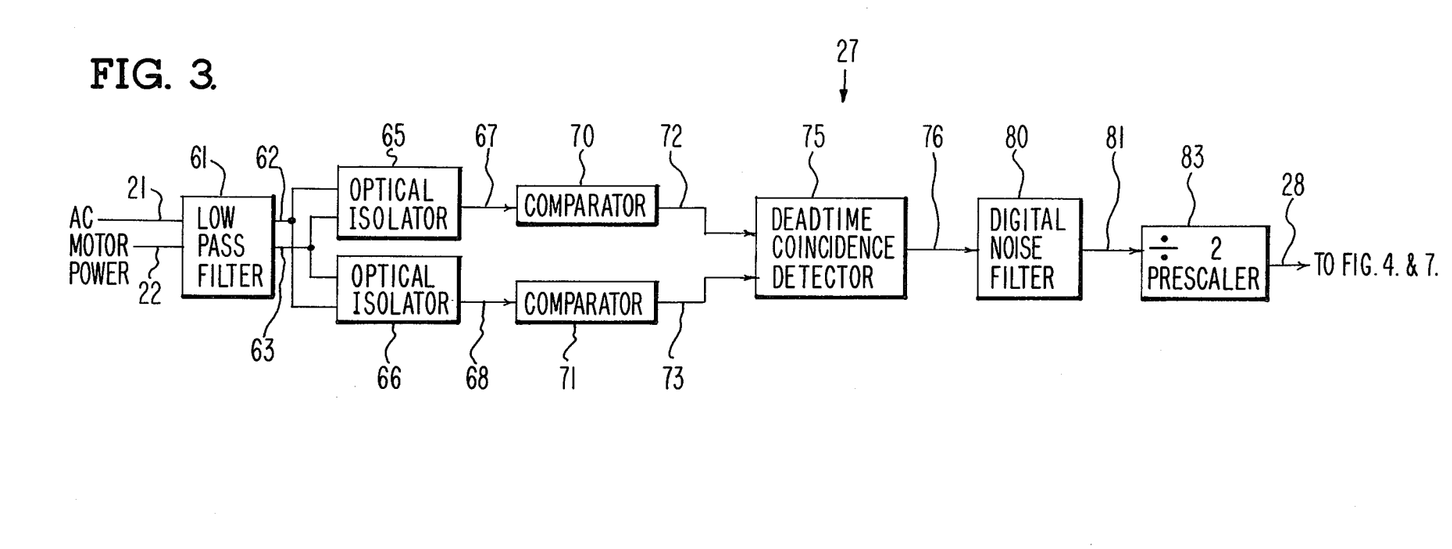
FIG. 3 is a detailed block diagram of the frequency detecting means block of FIG. 2.

FIG. 3 is a detailed block diagram of the electrical circuitry for the frequency detecting means 27. Briefly, frequency detecting means 27 receives AC motor power on leads 21 and 22 and provides a clean logic level square wave at its output 28 with the frequency of such square wave being the same as the frequency of the motor power on leads 21 and 22. The power on leads 21 and 22 is nominally 60 Hz, but this frequency can typically vary up to ±5%; to provide a corresponding variation in motor velocity and hence document transport velocity.

More particularly, with respect to the frequency detecting means 27, the AC motor power on leads 21 and 22 is input to a low pass filter 61. Filter 61 filters out high frequency noise and reduces the current drive capability at its outputs 62 and 63. The signals on outputs 62 and 63 provide the inputs to optical isolators 65 and 66. The optical isolators provide isolation between the motor power and logic ground. Optical isolator 65 turns on to yield a logical 0 at its output whenever its input is more positive than approximately 1 volt; and optical isolator 66 turns on to yield a logical 0 at its output 68 whenever its in put is more negative than approximately −1 volt. Outputs 67 and 68 have a logical 1 level of +5 volts and a logical 0 level of 0 volts. Therefore, for each cycle of power on leads 21 and 22, there are two deadtimes (at zero crossing) during which the signals on outputs 67 and 68 are simultaneously logical 1 levels for approximately 8 microseconds. The signals on outputs 67 and 68 are respectively input to comparators 70 and 71. The comparators 70 and 71 each trigger at approximately 4.75 volts and provide hysteresis for a Schmitt trigger effect at their respective outputs 72 and 73. The signals at outputs 72 and 73 are input to deadtime coincidence detector 75. Detector 75 senses each of the 8 microseconds deadtimes and in response thereto provides a logical 0 level output pulse 8 microseconds wide at its output 76. The signals on output 76 are input to a digital noise filter 80. Filter 80 is a one-shot multivibrator type and provides a 5.5 millisecond wide output pulse at 81 in response to the first negative-going input edge and disregards other negative-going input edges during the 5.5 milliseconds. The pulses on output 81 are input to a divide by 2 prescaler 83. The output of prescaler 83 at 28 is a clean logic level square wave with the frequency of such square wave being the same as the frequency of the motor power on leads 21 and 22.

Figure 4:
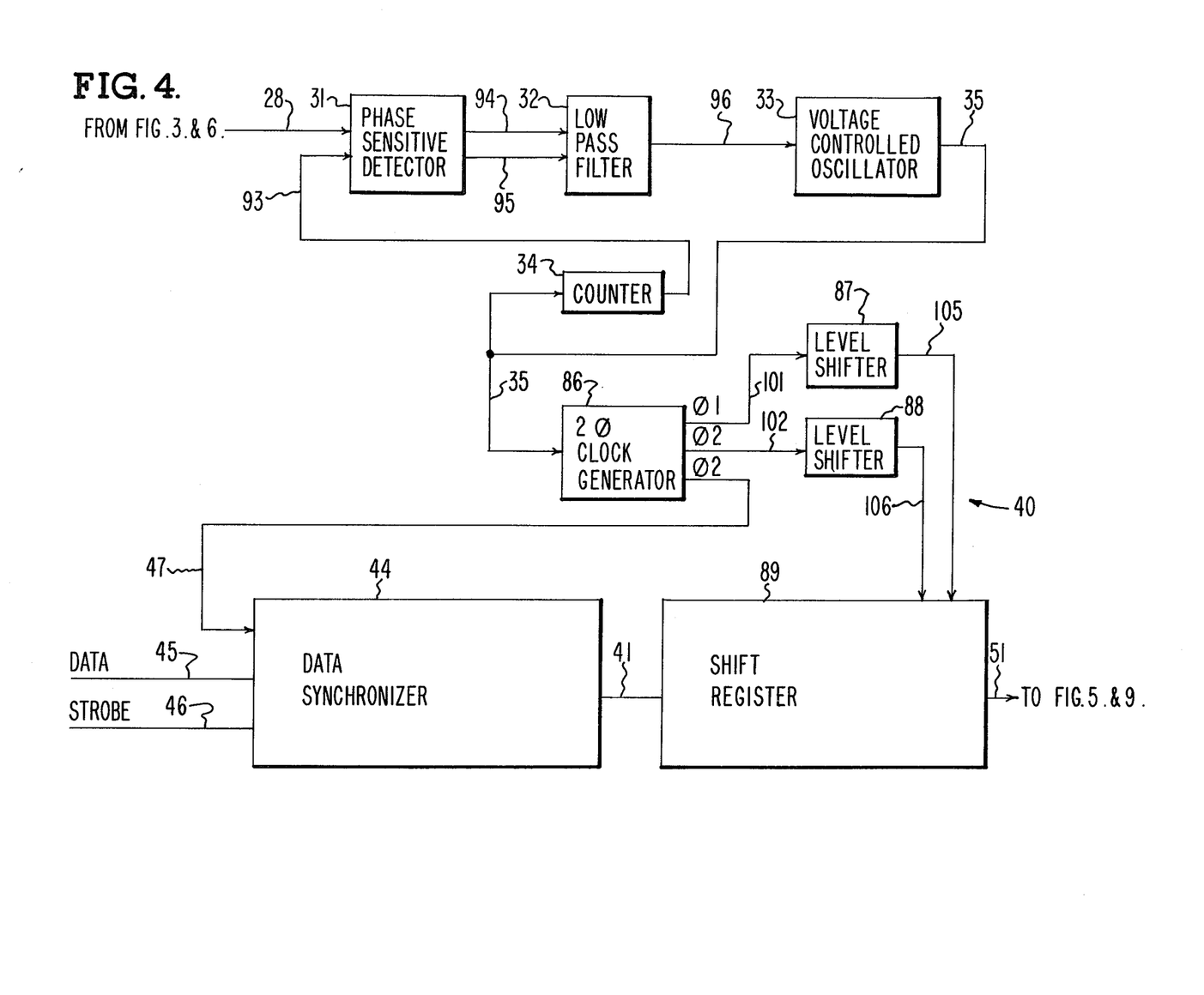
FIG. 4 is a detailed block diagram of the phase sensitive detector block, the low pass filter block, the voltage controlled oscillator block, the counter block, the data synchronizer block and the shift register circuitry block of FIG. 2.

FIG. 4 shows a detailed block diagram of the variable delay means of the present invention. Such variable delay means is provided by a phase locked loop and shift register circuitry.

Briefly, the phase locked loop of the variable delay means receives a logic level square wave (60 Hz nominal) from output 28 and provides a high frequency logic level signal (22.5 KHz nominal) at output 35. The variations in the frequency of the signal at output 35 are directly proportional to the frequency variations of the signal at output 28 and leads 21 and 22. Thus, output 35 provides a high frequency, high resolution signal and the frequency of this signal is representative of motor velocity.

Briefly, the shift register circuitry of the variable delay means includes a two phase clock generator 86, a pair of level shifters 87 and 88, and a shift register 89. Associated with the shift register circuitry is the data synchronizer 44. Synchronizer 44 synchronizes the can't read data 45 and the data strobe 46 from the character reader 23 to the shift register clock as previously described. The shift register 89 has a fixed length and provides the variably delayed signal at its output 51. The resulting variable delay is inversely proportional to variations in motor velocity from nominal. For example, if the motor velocity is higher than nominal, the high frequency clock signal on output 35 will be apparently higher than nominal, the data will be shifted through the shift register 89 faster than nominal and the variable delay will be proportionally shorter than nominal. Thus, the variable delay is inversely proportional to motor velocity such that the printer prints its mark over the appropriate character regardless of variations in motor velocity. Also, it should be noted that the single shift register can be providing a variable delay for several can't read signals at the same time (shifting them down in sequence).

More particularly, with respect to the phase locked loop, the phase sensitive detector 31 receives as inputs output 28 of frequency detecting means 27 and output 93 of counter 34. Detector 31 detects the phase difference between the falling edges of its input signals and in response thereto provides signals at its outputs 94 and 95. For example; if the input signals are in phase, then outputs 94 and 95 are open circuited; if the input 28 precedes the input 93, then output 95 is pulled up to 5 volts for a proportional time and output 94 remains open circuited; and if input 93 precedes input 28, then output 94 is pulled down to ground for a proportional time and output 95 remains open circuited. Outputs 94 and 95 are input to low pass filter 32 where they are summed together and then filtered. Filter 32 is a two pole low pass filter, one pole being provided by an active low pass filter and the other pole being provided by a passive low pass filter on the output of the active filter. The response of the filter 32 is selected such that the frequency response of the phase locked loop is similar to the frequency response of the AC motor and roller system that moves the documents. Filter 32 provides at its output 96 a filtered signal having a nominal level of approximately 2.5 volts and such signal varies slowly in magnitude and with time. Output 96 is input to voltage controlled oscillator 33. When the voltage level at output 96 goes up, the oscillator frequency at output 35 decreases; and when the voltage level at output 96 goes down, the oscillator frequency at output 35 increases. Output 35 is input to counter 34. Counter 34 counts 375 oscillator cycles, and then presets itself for another 375 count and simultaneously outputs a negative going logic level pulse approximately 22 microseconds wide on output 93. The falling edge of the signal on output 93 is used by the phase sensitive detector 31 for its comparison as previously described. Thus, when the phase locked loop is a closed loop and operating, the frequency at output 35 is a nominal 22.5 KHz (375 × 60 Hz) and the high frequency at output 35 tracks and varies in direct proportion to the output 28 from frequency detecting means 27.

More particularly with respect to the shift register circuitry, high frequency oscillator output 35 (a nominal 44.4 microseconds per cycle) is input to the two phase clock generator 86. Clock generator 86 utilizes a Johnson counter and cyclically provides a phase 1 at output 101 (that is a logic 1 for 44.4 microseconds nominal) and a phase 2 at outputs 102 and 47 (that are each also a logic 1 for 44.4 microseconds nominal) with such clock phases being separated in time by 44.4 microseconds each to provide a two phase timing cycle period of 177.6 microseconds nominal. Outputs 101 and 102 are input to level shifters 87 and 88. The level shifters convert their TTL logic level input signals to +5 and −12 volts as required to drive the clock inputs of shift register 89. Shift register 89 receives data synchronizer output 41 as its data input and is 198 bits long. Thus, at nominal motor velocity it takes 35.16 milliseconds (198 × 0.1776) to shift data through the register 89. Shift register 89 is of the MOS type and its data input is entered into the first bit during phase 1 of the two phase clock. Accordingly, the data input to shift register 89 is stable during phase 1 of the clock because data synchronizer 44 is synchronized to and changes its output 41 in response to phase 2 of the clock. Synchronizer 44 receives from character reader 23 two signals, one being a can't read data output 45 that is a TTL logical 1 whenever a character cannot be read, and the other being an accurately time data strobe 46 that is a brief TTL negative going pulse that occurs 1 millisecond after the character reader completes reading each character from the document. Synchronizer 44 provides at its output 41 the signal on data 45 (inverted) starting on the trailing edge of phase 2 that occurs immediately after strobe 46 and remaining until the trailing edge of the next succeeding phase 2. Thus, if data 45 is a logical 1, output 41 will be a logic 0 for 177.6 microseconds starting on the trailing edge of phase 2 immediately after strobe 46 occurs. Whenever the data strobe 46 does not occur or data 45 is a logical 0, the output 41 will be a logical 1. As previously stated, synchronized data output 41 is continuously shifted through register 89 to provide the variably delayed signal (the third electrical signal) at output 51. The signal on output 51 is inverted from the shift register input such that it is continuously a logical 0 except it becomes a logical 1 for one clock cycle (177.6 microseconds nominal) and such logical 1 represents the delayed can't read signal. Thus, the delayed signal at nominal motor velocity occurs 36.16 milliseconds after the completion of the character reading cycle and is accurate to within one shift register clock cycle or .18 milliseconds. Increased accuracy could be obtained by increasing the clock frequency.

Additionally, with respect to the shift register circuitry, it would be apparent that the shift register 89 could have been a TTL shift register utilizing a single phase clock such that the clock generator 86 and the level shifters 87 and 88 would not be necessary. Furthermore, if the data 45 and strobe had been ANDED together in the character reader and the resulting pulse has been lengthened to be a slightly greater than one shift register clock cycle wide, the data synchronizer could probably also be eliminated.

Figure 5:
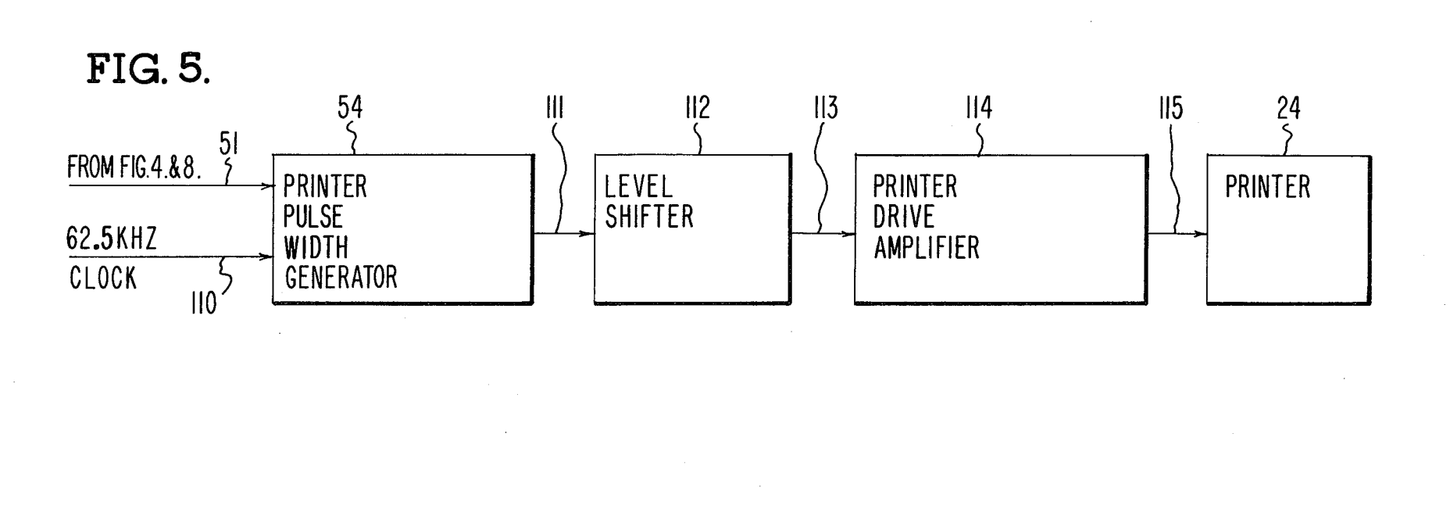
FIG. 5 is a detailed block diagram of the printer pulse width generator block, the printer drive circuitry block and the printer block of FIG. 2.

FIG. 5 shows a detailed block diagram of the indicating means of the present invention. Briefly, the indicating means receives the delayed signal (the third electrical signal) from output 51 and conditions the signal to provide a proper pulse width, voltage level and current drive to operate the printer 24.

More particularly, with respect to the indicating means, output 51 of the shift register 89 is input to printer pulse width generator 54. Generator 54 is a counter circuit that utilizes a 62.5 KHz clock from input 110 to generate a pulse at its output 111. The pulse at output 111 is positive going, starts with the leading edge of the pulse on output 51, and is 704 microseconds wide. The pulse on output 111 is input to a level shifter 112. Circuit 112 converts its TTL logic signal input to a 24 volt level on output 113. Output 113 is input to printer drive amplifier 114 which provides at its output 115 high current capability to drive the printer 24. Printer 24 is a solenoid actuated impact printer that prints a dot over the character that could not be read by the character reader as the document passes thereby.

Figure 6:
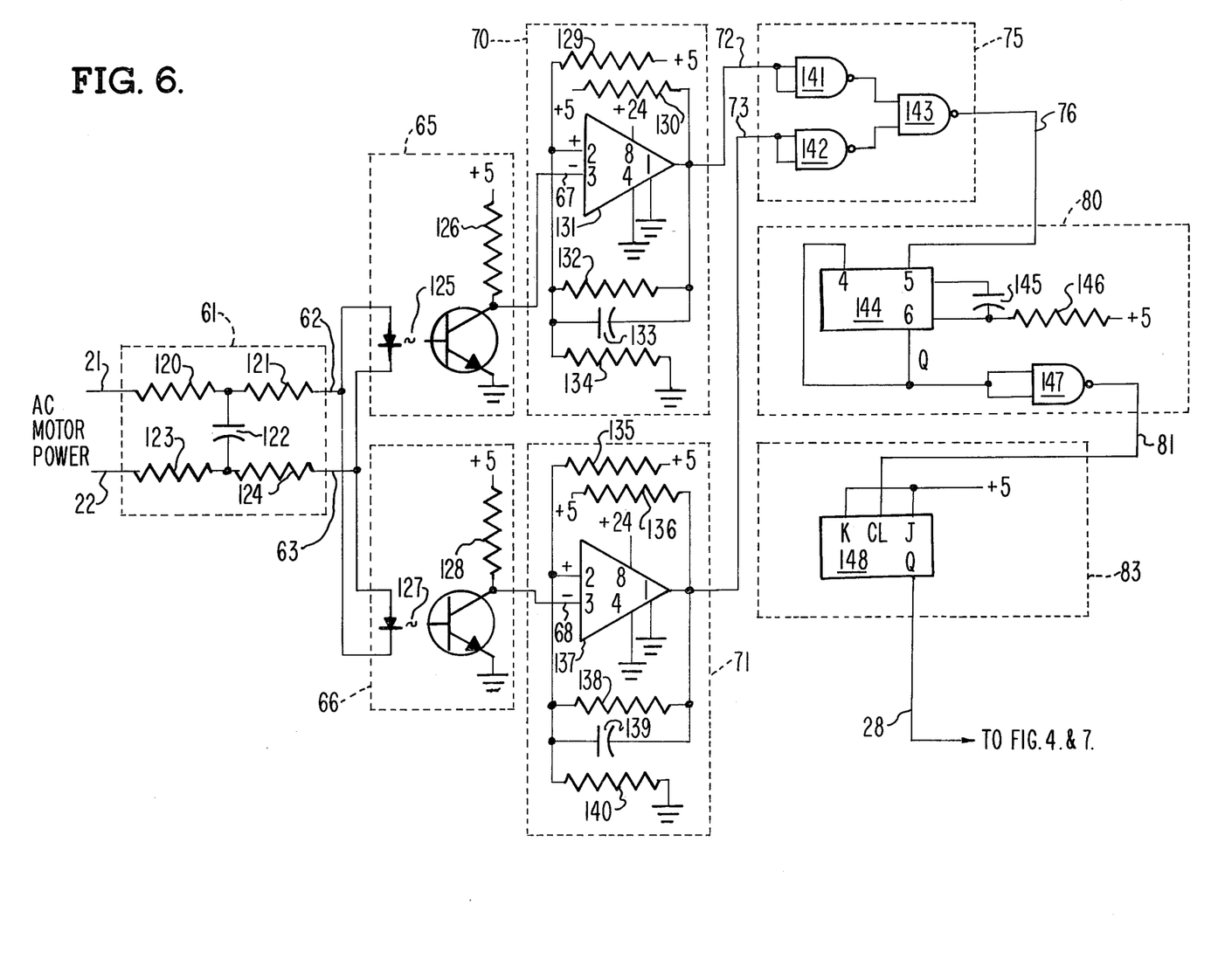
FIG. 6 is a circuit diagram for the block diagram of FIG. 3.
Figure 7:
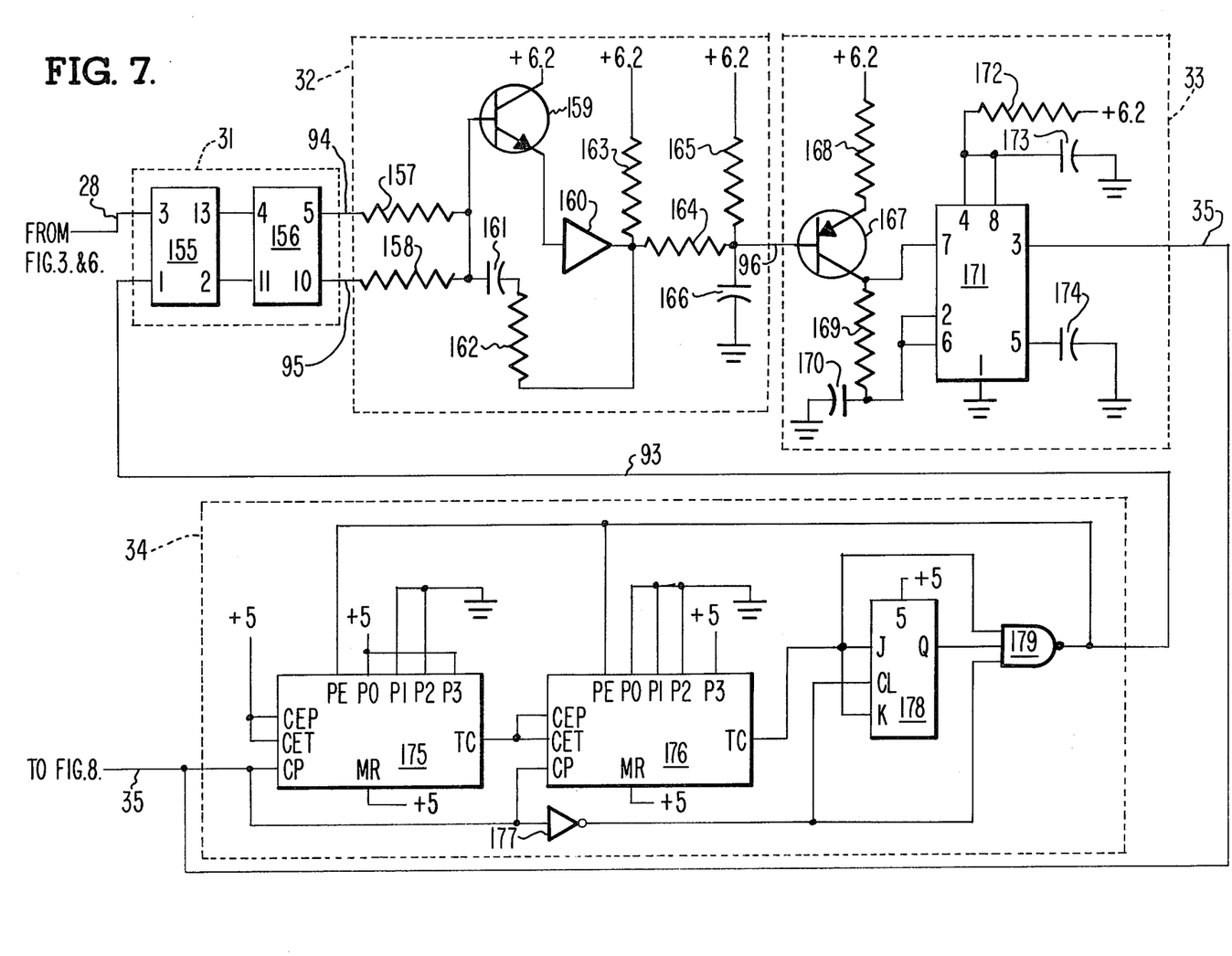
FIG. 7 is a circuit diagram for the phase sensitive detector block, the low pass filter block, the voltage controlled oscillator block and the counter block of FIG. 4.
Figure 8:
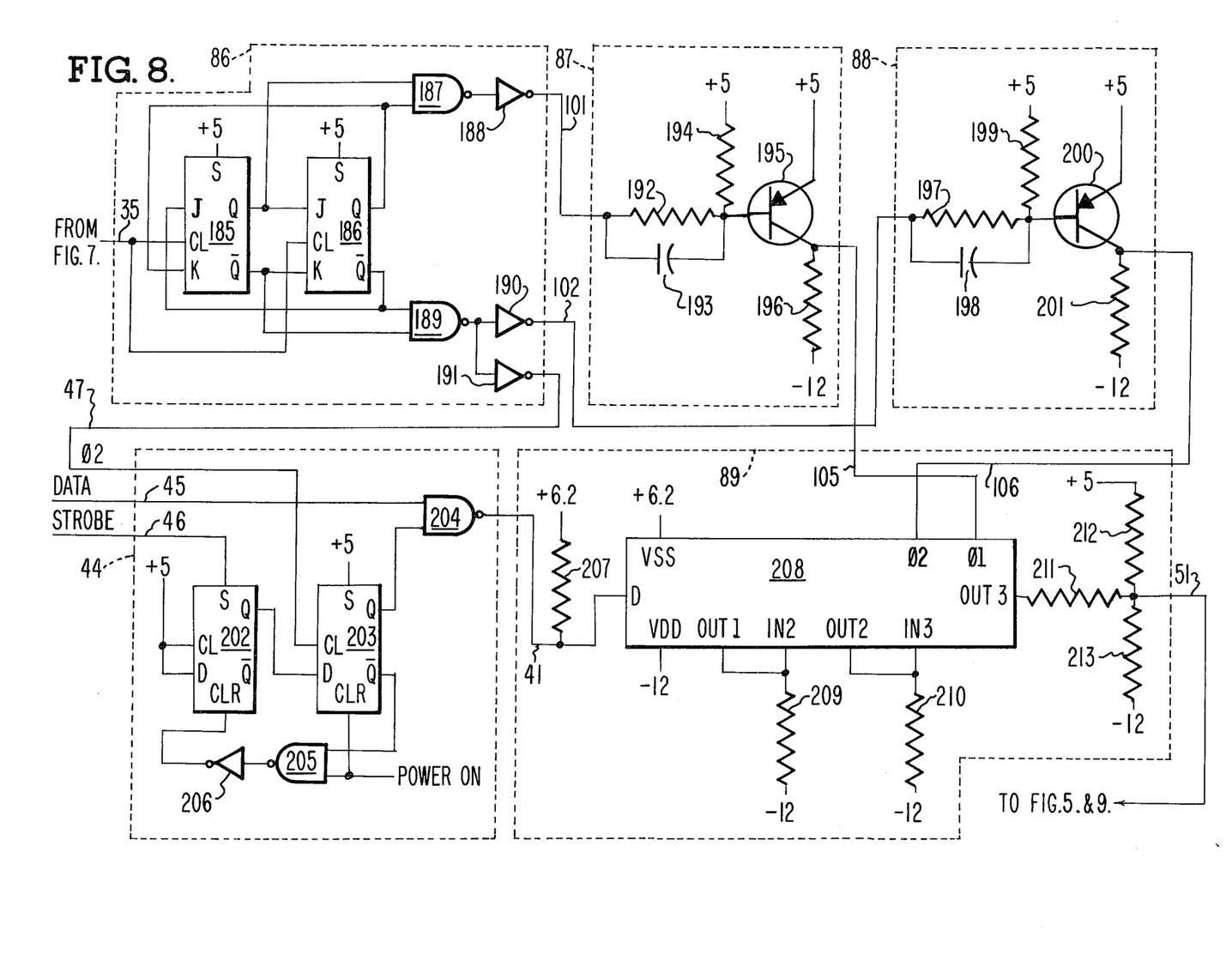
FIG. 8 is a circuit diagram for the data synchronizer block, the two phase clock generator block, the level shifter blocks and the shift register block of FIG. 4.
Figure 9:
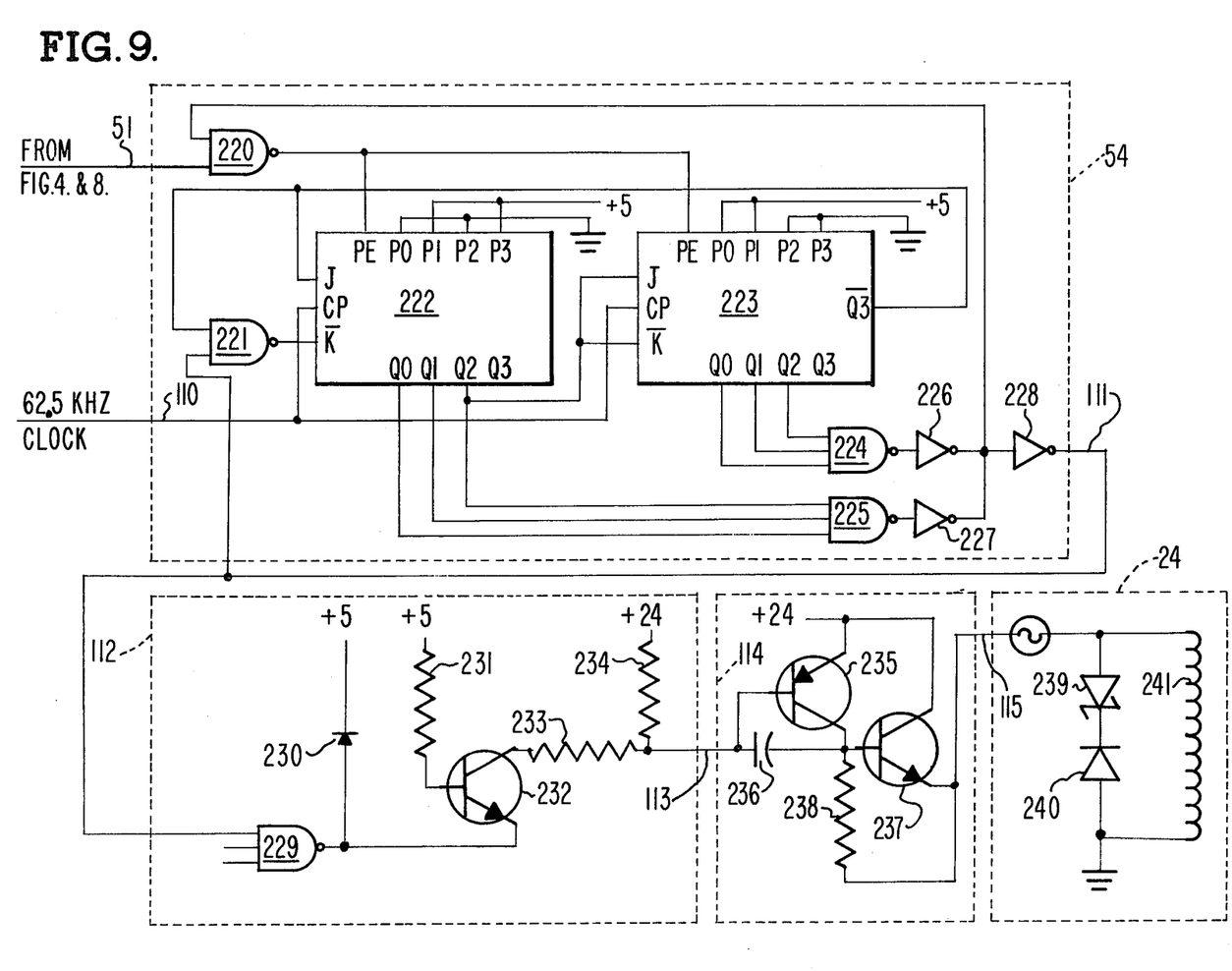
FIG. 9 is a circuit diagram for the block diagram of FIG. 5.

Schematic details for circuitry to provide the functions indicated for the blocks described in connection with FIGS. 3; 4; and 5 are respectively shown in FIGS. 6; 7 and 8; and 9. Further disclosure for the circuitry that has been set forth is provided by the data set forth below for the various components in terms of usable types and values.

| Component | Values or Types |
|---|---|
| 2 Input NAND 141, 142, 143, 147, 187, 189, 204, 205, 220, 221 | 7400 |
| Inverter 177, 191, 206, 228 | 7404 |
| 3 Input NAND 179, 224, 225 | 7410 |
| J-K Flip/Flop 202, 203 | 7474 |
| J-K Flip/Flop 148, 178, 185, 186 | 9093 |
| Binary Counter 175, 176 | 9316 |
| Shift Register 222, 223 | 9300 |
| Multivibrator 144 | 9602 |
| Multivibrators 171 | LM 555 |
| MOS Shift Register | 3326 |

| Component | Values or Types |
|---|---|
| 208 Comparator | LM 311 |
| 131, 137 Phase Sensitive Detector | Part of MC 4044 |
| 155, 156 Amplifier | Part of MC 4044 |
| 160 Inverter | 936 |
| 188, 190, 226, 227 3 Input NAND | 962 |
| 229 Transistors | 2N930 |
| 159, 232 | 2N3251 |
| 195, 200 | 2N3468 |
| 235 | 2N4208 |
| 167 | 2N4895 |
| 237 Diodes | |
| 230, 240 | IN4001 |
| 239 | IN4750 |
| Optical Isolators 125, 127 | GE H74C1 |
| Printer Solenoid 241 | 24 volt |
| Capacitors | |
| 133, 139 | 22 pf |
| 170, 236 | 1100 pf |
| 193, 198 | 4700 pf |
| 173, 174 | .01 uf |
| 122 | .1 uf |
| 145 | 1 uf |
| 166 | 15 uf |
| 161 | 100 uf |
| Resistors | |
| 172 | 100 |
| 238 | 390 |
| 211 | 750 |
| 192, 197 | 820 |
| 157, 158, 163, 168, 194, 196, 199, 201, 231, 234 | 1K |
| 120, 121, 123, 124, 135, 136 | 2K |
| 169 | 2.2K |
| 233 | 3.3K |
| 207 | 3.9K |
| 213 | 4.7K |
| 212 | 5.6K |
| 126, 128, 129, 130 | 6.2K |
| 162, 165, 209, 210 | 10K |
| 146 | 19.1K |
| 164 | 20K |
| 134, 140 | 62K |
| 132, 138 | 430K |

What is claimed is:

1. A document processing apparatus that reads characters from a document and indicates the characters that cannot be read on said document as the document passes through said apparatus comprising:

(a) a character reader that reads characters from said document and provides a first electrical signal in response to the inability to read one of the characters from said document;

(b) an indicating means located a fixed distance from said character reader for indicating on the document the character that cannot be read adjacent such character;

(c) motion means including an AC synchronous motor for moving said document in a continuous motion relative to and adjacent said reader and indicating means;

(d) motor velocity detecting means for detecting the velocity of said motor, said motor velocity detecting means providing a second electrical signal representative of said velocity; and (e) variable delay means for delaying said first electrical signal a variable amount in response to said second electrical signal, said variable delay means supplying a third electrical signal to said indicating means in response to which said indicating means indicates on said document the character that cannot be read.

2. An apparatus according to claim 1, wherein said variable delay means includes a phase-locked loop that provides a high frequency signal that is representative of the motor velocity.

3. An apparatus according to claim 2, wherein said phase-locked loop has a low pass filter whose time constant is similar to that of the motion means.

4. An apparatus according to claim 2, wherein said variable delay means further includes shift register circuitry that receives as a clock input the high frequency signal from said phase-locked loop.

5. An apparatus according to claim 4, wherein said motor velocity detecting means is a frequency detecting means that detects the frequency of excitation to said AC motor.

6. An apparatus according to claim 5, wherein said frequency detecting means includes a zero-crossing detector.

7. An apparatus according to claim 4, wherein said reader and indicating means are fixed and said document is moved.

8. An apparatus according to claim 4, wherein said reader detects magnetic characters.

9. An apparatus according to claim 4, wherein said indicating means is a printer.

10. A check processing apparatus that reads magnetic characters from a check and indicates the characters that cannot be read on said check as it passes through the apparatus, comprising:
(a) a frame;
(b) a character reader that is fixed to said frame, reads magnetic characters from said check and provides an electrical signal in response to the inability to read one of the characters from said check;
(c) a printer that is fixed to said frame, is located a fixed distance from said character reader and prints a mark on the check adjacent the character that cannot be read;
(d) means including an AC synchronous motor for continuously moving said check adjacent and transverse to said reader and printer;
(e) frequency detecting means for detecting the frequency of excitation to said AC motor, said frequency detecting means providing an electrical signal whose frequency is representative of the frequency of excitation;
(f) a phase-locked loop that receives as an input the signal from said frequency detecting means and provides in response thereto a high frequency signal that is also representative of said frequency of excitation; and
(g) fixed length shift register circuitry that receives as a data input the can't read signal from said character reader and receives as a clock input the high frequency signal from said phase-locked loop, said shift register circuitry supplying as an output a delayed electrical signal; and
(h) printer drive circuitry that receives said delayed electrical signal and in response thereto commands the printer to print said mark.

11. An apparatus according to claim 10, wherein said frequency detecting means includes a zero-crossing detector.

12. An apparatus according to claim 11, wherein the phase-locked loop has a low pass filter whose time constant is similar to that of the means for continuously moving said check.

13. An apparatus according to claim 12, wherein said low pass filter has two poles.

14. An apparatus according to claim 13, wherein said printer is an impact printer.

15. An apparatus according to claim 10, wherein said shift register circuitry includes synchronizing circuitry for synchronizing the can't read signal from said character reader to the high frequency output of said phase-locked loop.

16. An apparatus that processes a stack of documents comprising:
a feeder that feeds documents serially from said stack of documents;
an error-indicating character reader that operatively receives documents from said feeder, reads characters from said documents, marks on said documents the characters that cannot be read, and provides electrical signals representative of the characters read, said error-indicating character reader including
a character reader that reads characters from said serially fed documents, provides a first electrical signal in response to the inability to read one of the characters from one of said documents, and provides electrical character signals representative of the characters read;
an indicating means located a fixed distance from said character reader for indicating on the document the character that cannot be read adjacent such character;
motion means including an AC synchronous motor for moving said document in a continuous motion relative to and adjacent said reader and indicating means;
motor velocity detecting means for detecting the velocity of said motor, said motor velocity detecting means providing a second electrical signal representative of said velocity; and
variable delay means for delaying said first electrical signal a variable amount in response to said second electrical signal, said variable delay means supplying a third electrical signal to said indicating means in response to which said indicating means indicates on said document the character that cannot be read; and
a sorter that operatively receives documents and said electrical character signals from said error-indicating character reader and sorts said documents into groups in response to said electrical character signals.

17. An apparatus according to claim 16, further including an operator's console between said error-indicating character reader and said sorter, said operator's console having a keyboard for manually inputting the characters that could not be read by the character reader.

* * * * *